United States Patent [19]
Alexandrovich, Sr.

[11] 4,224,649
[45] Sep. 23, 1980

[54] AUTOMATIC CASSETTE HEAD DEMAGNETIZER

[75] Inventor: George Alexandrovich, Sr., Commack, N.Y.

[73] Assignee: Robins Industries Corp., Commack, N.Y.

[21] Appl. No.: 904,581

[22] Filed: May 10, 1978

[51] Int. Cl.² ............................................. G11B 5/46
[52] U.S. Cl. ................................... 360/128; 360/66; 361/149
[58] Field of Search ....................... 360/128, 66, 137; 335/284; 361/267, 149

[56] References Cited
U.S. PATENT DOCUMENTS 4,135,219   1/1979   Yoshizawa et al. ............... 360/137

*Primary Examiner*—Alfred H. Eddleman
*Attorney, Agent, or Firm*—Michael J. Striker

[57] ABSTRACT

An automatic electronic head demagnetizer is built into a standard cassette housing. The cassette housing is provided with a resiliently mounted pressure pad which forms part of an electrical switch connected to circuitry inside the cassette housing. When the cassette housing is inserted into a conventional cassette tape recorder or playback machine and the "play" button thereof is depressed, the machine head moves into engagement with the pressure pad, pushing the latter into the cassette housing. As a result, the pressure pad, which is electrically conductive, makes electrical contact with another switch component inside the cassette housing, thereby closing an electrical switch in the housing. This activates the control circuit for the demagnetizing inductor. In response to such activation, a demagnetizing field is established and then caused to decay from an initial maximum amplitude towards zero, whereas the frequency of the demagnetizing field is caused to increase from zero. After about 5 seconds, the user of the machine presses the "stop" button, thereby causing the machine head to cease pressing against the pressure head and accordingly causing the switch to open and the demagnetizing operation to cease.

15 Claims, 3 Drawing Figures

AUTOMATIC CASSETTE HEAD DEMAGNETIZER

BACKGROUND OF THE INVENTION

The invention relates generally to demagnetizing the head of a cassette tape recorder or playback machine.

It is desirable that the demagnetizing of the head of such a machine be capable of being performed in a very simple manner, in order to take into account the limited patience and understanding of the users of many cassette machines. Accordingly, demagnetizing procedures, however effective, which are complicated or, although simple, require manipulative steps markedly different from those involved in normal use of a cassette tape recorder or playback machine, are undesirable from a commerical and practical point of view.

SUMMARY OF THE INVENTION

It is a general object of the invention to provide a device for demagnetizing the head of a cassette tape recorder or playback machine so designed as to be easily used by the user of the machine and to require very few manipulative operations, with those manipulative operations being identical to manipulative operations involved in normal use of the machine and accordingly familiar to the machine user.

This object, and others which will become understandable from the description, below, of preferred embodiments, can be met, according to one advantageous concept of the invention, by providing the demagnetizing arrangement in a conventional cassette housing, making the demagnetizing arrangement automatic and electronic, and so designing the activating means of the demagnetizer that it can be manipulated by operating one of the buttons, or equivalent control means, anyway present on the cassette tape recorder or playback machine.

According to one particularly advantageous concept of the invention, the demagnetizing arrangement is provided with an activating switch one of whose components is constituted by an electrically conductive pressure pad similar to the conventional pressure pad of a standard tape cassette. Thus, when the demagnetizing cassette of the invention is inserted, like an ordinary tape cassette, into the tape recorder or playback machine, and when thereafter the "play" button of the machine is operated, the play head of the machine will move into engagement with the electrically conductive pressure pad, moving the latter into the cassette housing. By providing a suitable further electrically conductive switch component in the path of retracting movement of such pressure pad, one forms from such pressure pad and further switch component an electrical switch which can be used to activate the control circuit for the demagnetizer.

Accordingly, the performance of a complete demagnetizing operation requires only that the user insert the cassette into his machine in the normal way, depress the "play" button or another button having a similar effect upon the play head, and then after a short period of time press the "stop" button, to terminate the demagnetizing operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
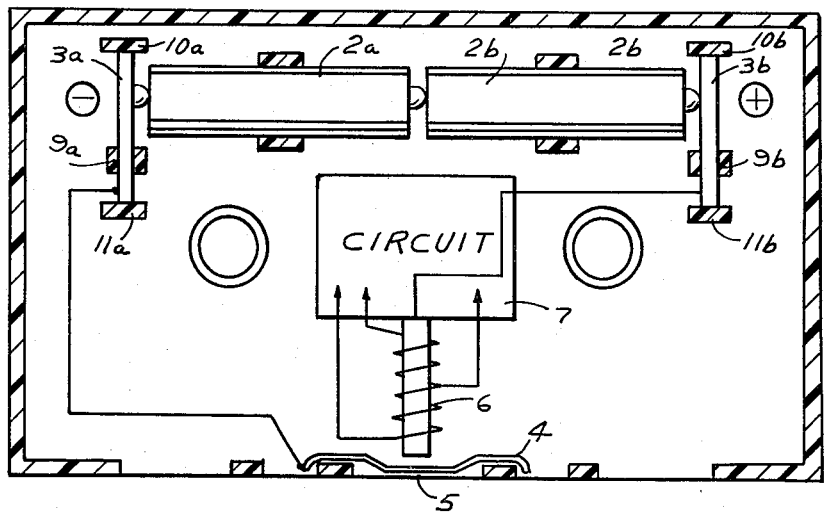
FIG. 1 is a broken-away view showing the interior of a conventional cassette housing.

FIG. 1 depicts a partly sectioned, broken-away view showing the internal components of a demagnetizing cassette according to the invention. Reference numeral 1 designates a conventional cassette housing for cassette tape recorders and playback machines of conventional construction. The use of a conventional cassette housing 1 assures that the electronic demagnetizer arrangement can be inserted into any cassette tape recorder or playback machine of conventional design.

Provided in the interior of cassette housing 1 are two conventional batteries 2a, 2b. These are held in their proper positions in respective battery holders 8a and 8b which advantageously are portions integral with the side wall of the cassette housing. Tha axial ends of the batteries 2a, 2b are retained in place by respective electrical contact plates 3a, 3b. The contact plates 3a, 3b are in turn held in their proper positions by synthetic plastic positioning portions 9a, 10a, 11a and 9b, 10b, 11b which, again, are preferably integral with the side wall of the cassette housing; alternatively, the contact plates 3a, 3b could be embedded directly into the synthetic plastic material of the cassette housing wall.

The negative-terminal contact plate 3a is electrically connected to a metallic mounting bracket 4. Mounting bracket 4 may be a conventionally designed metallic mounting bracket for a pressure pad 5. In the illustrated embodiment, the pressure pad 5 is made of metal and supported on the metallic mounting bracket 4 in conventional manner. The positive-terminal contact plate 3b is electrically connected to a circuit 7 contained in cassette housing 1, and shown in detail in FIG. 2.

The metallic mounting bracket 4, the pressure pad 5 and a coil slug 6 are so disposed relative to each other that, when the pressure pad 5 is pressed into the cassette housing 1, it makes electrical contact with the coil slug 6, thereby establishing an electrical connection between the negative-terminal contact plate 3a and the coil slug 6. In this way, the metallic pressure pad 5 and the coil slug 6 cooperate to act as a normally open switch. This switch is connected to the circuit components in circuit 7 in a manner depicted in FIG. 2, to which attention is now directed.

Figure 2:
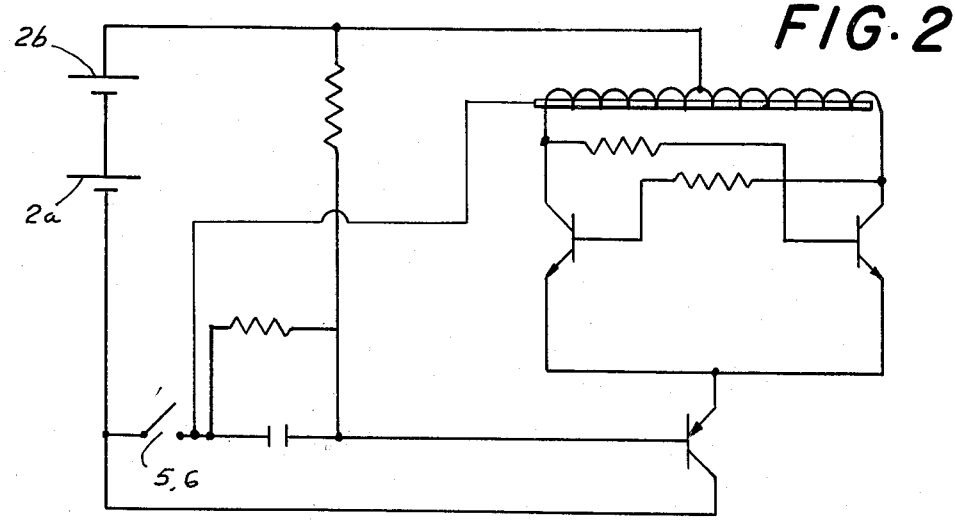
FIG. 2 depicts the circuitry contained in the interior of the conventional cassette housing.

FIG. 2 depicts the circuit 7, connected to the electrical switch 5, 6 and to the batteries 2a, 2b. The circuit 7 is essentially an oscillator or a multivibrator circuit, comprised in the conventional way of cross-coupled transistors and resistor-inductor timing elements.

Figure 3:
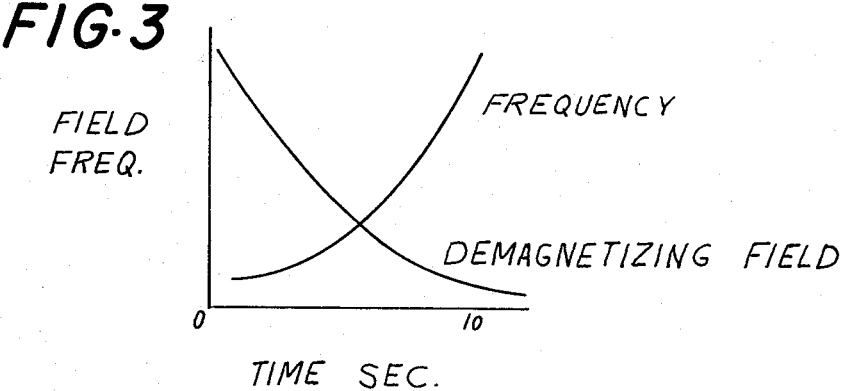
FIG. 3 is a graph depicting aspects of the operation of the illustrated arrangement.

The operation of the illustrated arrangement will now be described, with reference also to FIG. 3.

The cassette housing 1, with the fully automatic electronic demagnetizer arrangement therein, is inserted into the housing of a conventional cassette tape recorder or playback machine. The "play" button of the machine is thereupon depressed, causing the (non-illustrated) play head of the machine to be moved into engagement with the pressure pad 5, pushing the pressure pad 5 into the cassette housing 1 and thereby establishing electrical contact between the pressure pad 5 and the coil slug 6. This causes the switch 5, 6 shown in FIG. 2 to close. When this occurs, the multivibrator circuit commences to operate. The operation of the multivibrator circuit is depicted in FIG. 3. When the switch 5, 6 is caused to close, the field current flowing through the multivibrator coil, used to demagnetize the play head of the cassette tape recorder, is at its maximum value, whereas the frequency of the multivibrator oscillations, and thereby the frequency of the demagnetizing field, is at its minimum value. As time passes, the amplitude of the demagnetizing field decays towards zero, as is necessary if proper demagnetization is to be performed, whereas the frequency of the demagnetizing field rises.

Advantageously, the initial and final amplitude and frequency of the demagnetizing field are so selected that the user of the demagnetizer will to a great extent actually hear the progress of the demagnetizing operation, or at least a substantial portion of the demagnetizing operation. For example, when the user inserts the demagnetizing cassette and presses the "play" button of the machine, the machine will be in playback condition. The initial high-amplitude low-frequency demagnetizing field acting upon the play head will result in the generation of an audible signal. As the demagnetization progresses, the amplitude of the audible signal will decrease whereas its frequency will increase. Advantageously, the rates of this decrease and increase are so chosen as to make for a characteristic shrill whistle, indicative of operation of the demagnetizer. Additionally, the decay to zero of the field amplitude will produce an associated decay of the audible signal. When the signal has died down into inaudibility, the user of the device will know that the magetizing operation is finished. Advantageously, therefore, but not necessarily, the dimensions of the oscillator circuit used to establish the decreasing-amplitude increasing-frequency field are so chosen that the frequency of the field will still be within the range of audible frequencies at the end of the amplitude decay. Variations in the ranges of amplitude and frequency associated with the complete performance of a demagnetizing operation are possible. Thus, whereas it is advantageous that the initial frequency of the demagnetizing field be within the range of audible frequencies, it is also sufficient if the initial frequency is below such range but soon enters such range. Likewise, it is advantageous that the final frequency of the demagnetizing field be within the range of audible frequencies, but it is sufficient that the rise of the field frequency past the range of audible frequencies not occur substantially before the amplitude of the demagnetizing field has died down to an acceptable end value. Alternatively, or in addition to the foregoing, the output waveform of the demagnetizing circuit could be so selected as to result in the generation of an alternative or additional audible signal having other characteristics indicative of the progress and/or completion of the demagnetizing operation.

After about 5 seconds of operation, the user of the cassette demagnetizer presses the "stop" button, causing the cassette machine head to move out of engagement with the pressure pad 5, and thereby effect opening of electrical switch 5, 6. Thereupon, the user removes the demagnetizing cassette from the cassette machine and instead inserts a conventional cassette, for recording and/or playback purposes.

Whereas it is particularly advantageous to use the coil slug 6 as part of the electrical switch 5, 6, in principle a further, discrete switch component could be used in place of switch component 6. Likewise, whereas a particular multivibrator circuit is shown, it will be understood that other multivibrator circuits can be employed.

It will be understood that each of the elements described above, or two or more together, may also find a useful application in other types of circuits and constructions differing from the types described above.

While the invention has been illustrated and described as embodied in a fully automatic electronic demagnetizer cassette unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is:

1. An automatic electronic demagnetizer unit for tape recorders and playback machines using tape cassettes having standard cassette housings, comprising, in combination, a standard cassette housing insertable into such a machine; and a demagnetizing arrangement inside the standard cassette housing, the demagnetizing arrangement including stationary inductor means so positioned relative to the cassette housing as to direct when energized a magnetic field towards the play head of the machine, a control circuit connected to the inductor means and operative when activated for controlling the energization of the inductor means at a variable frequency to cause the latter to perform a demagnetizing operation, and electrical switch means so positioned in the cassette as to be activated in automatic response to movement of the play head of the machine into normal playback position and operative when so activated for activating the control circuit to thereby initiate the performance of a demagnetizing operation, whereby the demagnetizing operation can be initiated in automatic response to depression of the play button of the cassette machine or analogous activation of an analogous control member on the machine.

2. The demagnetizer unit defined in claim 1, wherein said inductor means includes a metallic member and the switch means comprises a pair of switch components, and wherein one of the switch components is a movable metallic pressure pad occupying the position normally occupied by a pressure pad in the housing of a standard tape cassette, and wherein the other one of the switch components is said metallic member located behind the metallic pressure pad and so positioned as to be electrically engaged by the latter when the pressure pad is pushed back into the cassette housing by the play head of a cassette machine into which the cassette housing has been inserted.

3. The demagnetizer unit defined in claim 2, wherein the inductor means includes an inductor coil and a cooperating coil slug, and wherein the coil slug furthermore constitutes the other switch component of the switch means.

4. The demagnetizer unit defined in claim 1, wherein the control circuit includes a source of electrical energy located in the interior of the cassette housing.

5. The demagnetizer unit defined in claim 3, wherein the control circuit includes a source of electrical energy located in the interior of the cassette housing and supplying energy to the inductor means.

6. The demagnetizer unit defined in claim 5, wherein the control circuit includes means for causing the field emitted by the inductor means to be an oscillating field of decaying amplitude.

7. The demagnetizer unit defined in claim 5, wherein the control circuit includes means for causing the field emitted by the inductor means to be an oscillating field of decaying amplitude and rising frequency.

8. The demagnetizer unit defined in claim 5, wherein the control circuit includes oscillator means resistance coupled to the inductor means and to the source of electrical energy for causing the energization of the inductor means to decay in amplitude and rise in frequency.

9. The demagnetizing unit defined in claim 1, wherein the control circuit includes means for causing the field of decaying amplitude.

10. The demagnetizing unit defined in claim 1, wherein the control circuit includes means for causing the field emitted by the inductor means to be an oscillating field of decaying amplitude and rising frequency.

11. The demagnetizing unit defined in claim 1, wherein the control circuit includes means for causing the field emitted by the inductor means to be an oscillating field of rising frequency.

12. The demagnetizing unit defined in claim 1, wherein the control circuit includes means for causing the field emitted by the inductor means to have a characteristic resulting in the generation, by the playback means of the machine, of an audible signal having a varying audible characteristic indicative of the progress of the demagnetizing operation.

13. The demagnetizing unit defined in claim 1, wherein the control circuit includes means for causing the field emitted by the inductor means to have a varying characteristic resulting in the generation, by the playback means of the machine, of an audible signal having a varying audible characteristic indicative of the completion of the demagnetizing operation.

14. The demagnetizing unit defined in claim 1, wherein the control circuit includes means for causing the field emitted by the inductor means to have at least one varying characteristic resulting in the generation, by the playback means of the machine, of an audible signal having at least one varying audible characteristic indicative of the progress and completion of the demagnetizing operation.

15. The demagnetizing unit defined in claim 1, wherein the control circuit includes means for causing the field emitted by the inductor means to have an amplitude which decays and a frequency which rises from and to values resulting in the production, by the playback means of the machine, of an audible signal of initially high amplitude and low frequency which changes into an audible signal of low amplitude and high frequency and has the character of a shrill whistle.

* * * * *